July 6, 1926.  
O. L. SMITH  
1,591,864  
BRAKE BAND RIVETING MACHINE  
Filed Nov. 2, 1925
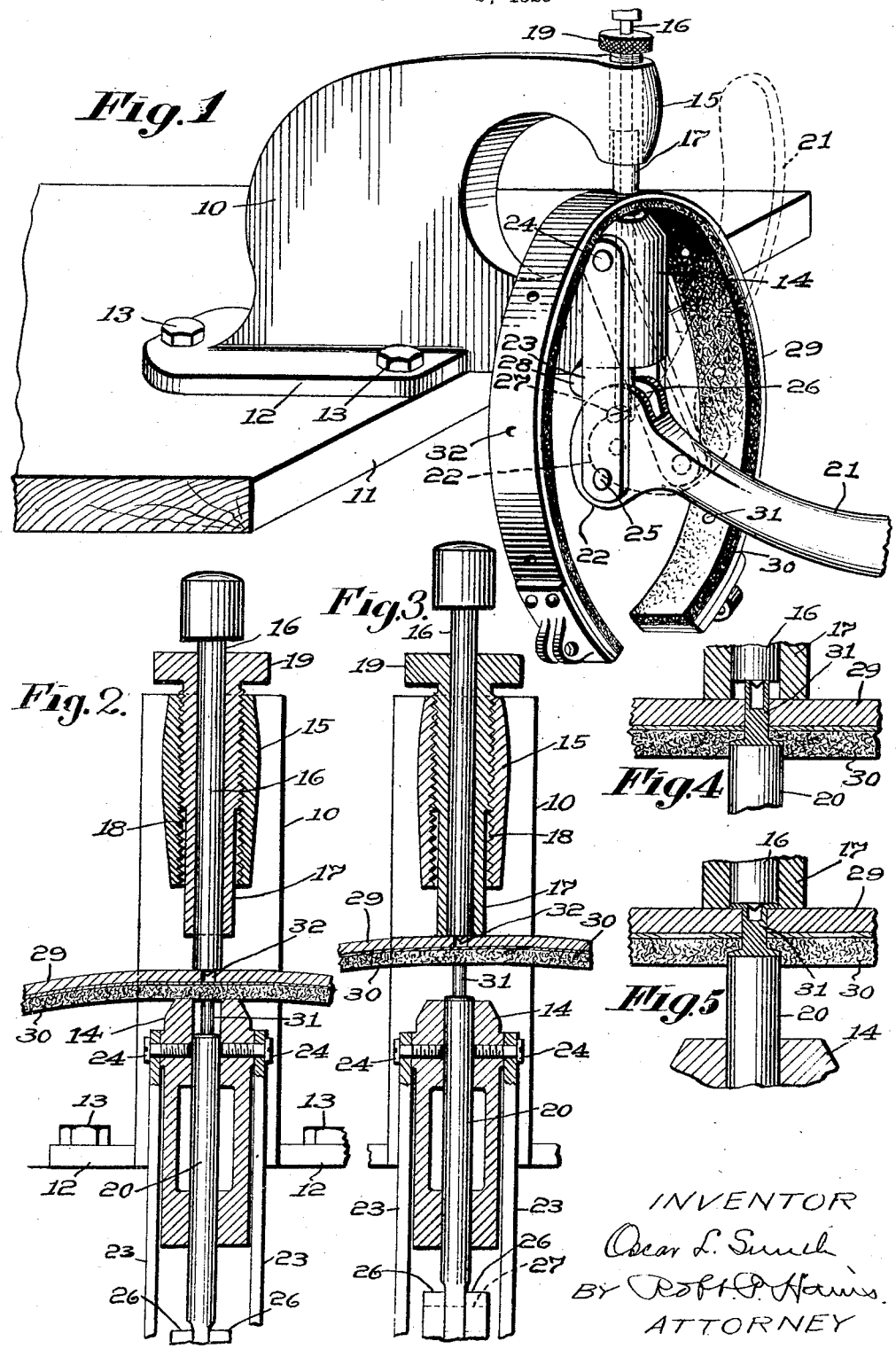
INVENTOR  
Oscar L. Smith  
BY Robt P. Harris  
ATTORNEY Patented July 6, 1926.

1,591,864

UNITED STATES PATENT OFFICE.

OSCAR L. SMITH, OF RYDAL, PENNSYLVANIA, ASSIGNOR TO PENN RIVET CORPORATION, OF PHILADELPHIA, PENNSYLVANIA, A CORPORATION OF VIRGINIA.

BRAKE-BAND-RIVETING MACHINE.

Application filed November 2, 1925. Serial No. 66,249.

This invention relates to machines for riveting brake band lining to a brake band.

A good practical way of securing the lining to brake bands is to drill and countersink the lining to receive the rivets so that the heads of the rivets will lie well below the face of the lining when the rivets are clinched in place. This method of securing lining to brake bands, however, requires two machines, one for drilling and countersinking the lining, and the other for forcing the rivets into place and setting them.

There is a demand in many small garages and automobile repair shops for a single cheap machine which can be used in place of the two machines just mentioned to secure brake band lining to brake bands.

The present invention therefore relates to an inexpensive hand-operated machine for riveting lining to brake bands and which costs much less than the two machines required when the rivet heads are countersunk into the brake lining.

In the present machine the rivets are forced or punched into the brake band lining without previously drilling holes in the lining to receive them and in this manner the cost of a drilling machine is avoided.

One important feature of the present invention resides in a riveting tool or set which serves to centre a hole in the brake band in position to receive the rivet as it is forced thru the brake lining.

Another feature of the invention resides in an adjustable sleeve or abutment which engages the brake band as the rivet is forced thru the lining and which is adapted to receive the riveting tool or set to clinch the rivet that projects thru the brake band into the sleeve. Still another feature of the invention resides in a lever operated plunger for forcing the rivets into the lining, and in the disposition of the adjustable sleeve whereby the depth to which the head of a rivet will be forced into the lining is controlled by adjusting the sleeve.

Other features of the invention and novel combination of parts in addition to the above will be hereinafter described in connection with the accompanying drawings which illustrate one good practical form of the invention.

In the drawings:—

Fig. 1 is a perspective view of the riveting machine of the present invention, the operating handle being shown in full lines in the rivet clinching position and in dotted lines in the inoperative position.

Fig. 2 on an enlarged scale is a vertical sectional view thru the riveting machine, the parts being shown in the position they occupy at the beginning of the rivet inserting operation.

Fig. 3 is a view similar to Fig. 2, but shows the parts in the position they occupy after the rivet has been forced upwardly by its plunger sufficently to raise the brake band into engagement with the upper stop.

Fig. 4 on a still larger scale is a sectional view showing the position of the parts when the rivet has been forced home and is ready to be clinched; and Fig. 5 is a view similar to Fig. 4, showing the position of the parts after the rivet has been clinched.

The frame 10 for supporting the operating parts of the riveting machine may be variously constructed, and as shown has a somewhat C-shape construction, and may be conveniently formed of cast metal. The frame 10 is preferably adapted to be secured to a work bench or other support 11, and is therefore provided with laterally extending flanges 12 which may be secured to the bench 11 by bolts 13.

The frame 10 is preferably provided with a support or anvil 14 upon which the work may rest at the beginning of the riveting operation, and above the support 14 is provided the spaced head 15. Within the head 15 is slidably mounted a riveting tool or set 16 and this tool may serve also as a finder adapted to engage a hole in the brake band and centre the same, as will presently appear. The head 15 is also provided with a hollow sleeve or abutment 17 which is adapted to engage the upper face of the brake band during the operation of inserting a rivet, as will more fully appear. The sleeve is preferably adjustably secured to the head 15, and various constructions to this end might be provided. In the present case the sleeve 17 has a threaded portion which screws into the internally threaded portion 18 of the head 15 and the sleeve is provided with a knurled portion 19 which may be grasped between the fingers and rotated to change the adjustment of the sleeve. The construction of the sleeve, as will be apparent from the drawings, is such that the riveting tool 16 may extend thru the sleeve.

As above stated, means is provided for forcing rivets into the brake lining without previously drilling the lining to receive the rivets, and one good practical construction to this end will now be described. The work support or anvil 14 has a central bore in alignment with the bore of the hole in the head 15 for receiving the riveting tool, and in this bore is slidably mounted a plunger 20.

Various means might be provided for raising and lowering the plunger 20, and the means shown to this end consist of a hand operated lever 21 having an enlarged head 22 and the head is supported by a pair of links 23, the upper ends of which are pivotally secured to the opposite sides of the support 14 by screws 24 and the lower ends of these links are pivotally secured to the head 22 by the pins 25. The upper portion of the head 22 is slotted as at 26 and is adapted to receive the lower end of the plunger 20, this lower end being pivotally secured to the bifurcated portion of the head 22 by a pivot pin 27. As a result of the construction just described, the plunger 20 will be raised and lowered as the lever is operated, and when the lever is in the position shown in full lines in Fig. 1 the pivot pins 24, 27 and 25 will lie in the same plane to lock the plunger 20 in its uppermost position, and when the hand lever 21 is moved upwardly, to the position shown in dotted lines in Fig. 1, the links 23 will move to the inclined position shown, and the plunger will move downwardly in a vertical direction, as will be apparent. It may be desirable to arrest the downward movement of the lever 21 when it has reached the dead centre position, and to this end, in the construction shown, a lug 28 upon the support 14 constitutes a stop against which one of the links 23 will strike as the lever 21 reaches the dead centre position.

The operation of the riveting machine shown and described is as follows:—The work, consisting of a brake band 29 having the brake band lining 30 inside of the band, is placed upon the support or anvil 14, but before this is done a rivet 31 should be placed in the socket in the upper end of the support 14, to rest upon the upper end of the plunger 20, as shown in Fig. 2. The riveting tool 16 is lowered into any one of the holes 32 in the brake band to centre the hole with respect to the rivet 31. The lever 21 is then moved downwardly by hand towards its full line position, and as it is lowered the rivet 31 will force the brake band and lining upwardly into abutting engagement with the hollow sleeve 17, as shown in Fig. 3. As the upward pressure upon the plunger 20 is increased the rivet 31 will penetrate the lining 30 and the shank of the rivet will pass therethru to enter the drill hole 32 in the brake band, as will be apparent from Fig. 4. The plunger 20 is shown in Figs. 4 and 5 in the uppermost position in which it is held when the pivot pins of the hand lever occupy the dead centre position above mentioned. While the parts are in this position the riveting tool or set 16 may be struck with a hammer to clinch the rivet, as shown in Fig. 5, whereupon the operation of inserting this particular rivet is completed and the hand lever may be raised so that the next hole of the brake band may be moved into position to receive a rivet. It will be understood that the weight of the riveting tool or set 16 may be sufficient to retain the lower end of the same in centreing position with a hole 32 of the brake band, while at the same time the set is free to move upwardly under the lifting action of the rivet 31, as shown in Fig. 3.

It is desirable to provide means for regulating the depth to which the head of a rivet may be sunk into the brake lining, and this is accomplished in the present case by adjusting the sleeve 17 towards or from the work support 14 to thereby regulate the distance between the lower end of the sleeve and the upper end of the plunger 20 when the latter is in its uppermost position. The thickness of the lining and of the brake band riveted on the present machine may vary, and the threaded sleeve 17 may be easily adjusted in one direction or the other to accommodate this variation and to regulate the depth to which the head of a rivet may be forced into a particular brake band lining.

From the foregoing it will be clear that the riveting machine of the present invention is simple in construction and inexpensive to manufacture and that the hand lever 21 may be quickly operated to force a rivet into the brake lining to the desired degree and to hold the rivet in this position while it is being clinched.

What is claimed is:

1. In a machine for riveting brake band lining to brake bands, the combination of a support for the brake band, a head disposed above and in spaced relation to the support, a combined finder and rivet set slidable within the head and adapted to engage a hole in the brake band to centre the same, and means for punching a rivet thru the brake band lining into a hole in the brake band and for retaining the rivet in place while it is clinched by the set.

2. In a machine for riveting brake band lining to brake bands, the combination of a support for the brake band, a head disposed above and in spaced relation to the support, a combined finder and rivet set slidably supported by the head and adapted to engage a hole in the brake band to center it relatively to the support, and a threaded sleeve adjustably mounted in the head to press the brake band against the brake band lining during the insertion of a rivet and provided with a central opening to receive the set as the latter is actuated to clinch the rivet.

3. In a machine for riveting brake band lining to brake bands, the combination of a support for a brake band, a head disposed above and in spaced relation to the support, a sleeve mounted in said head and extending downward therefrom to form an abutment for the brake band, a sliding plunger for forcing a rivet upwardly into the brake band lining and into a hole in the brake band, means for actuating the plunger, and a set slidably positioned in said sleeve and operable as a finder to centre the hole in the brake band over a rivet and also to clinch a rivet while the latter is supported by the plunger within the brake band lining.

4. In a machine for riveting brake band lining to brake bands, the combination of a support for a brake band, a head disposed in spaced relation to the support, a hollow abutment upon the head and in position to take the thrust of the brake band while a rivet is being inserted in the lining, a movable element upon said support and operable to force a rivet into the lining to enter a hole in the brake band, and a set extending through the hollow abutment and operable as a finder to centre the hole in the brake band relative to the rivet and also to clinch the rivet after the latter has been completely inserted by the movement of said element.

5. In a machine for riveting brake band lining to brake bands, the combination of a support for a brake band, a head disposed above and in spaced relation to the support, a sleeve threaded in said head and extending downwardly therefrom to form an adjustable abutment for the brake band, a combined finder and set slidable within said sleeve to center a hole in a brake band, and an element upon said support for forcing a rivet into the lining in position to enter the centered hole in the brake band, said set being constructed to spread the end of the rivet to clinch it.

6. In a machine for riveting brake band lining to brake bands, the combination of a support having a rivet receiving recess, a head disposed above and in spaced relation to the support, a combined finder and rivet set slidably supported by the head and adapted to engage a hole in the brake band to centre the same, and a plunger slidably mounted in the support and operable to punch a rivet up thru the lining into the centered hole and to retain the rivet in place while it is clinched by the set.

7. In a machine for riveting brake band lining to brake bands, the combination of a support for a brake band, a head disposed above and in spaced relation to the support, a combined finder and rivet set slidably supported by the head and adapted to engage a hole in the brake band to centre it, a plunger slidably mounted in the support, means for operating the plunger to force a rivet up thru the lining into the centered hole, and a head upon the set adapted to receive a blow that will cause the set to clinch the rivet.

8. In a machine for riveting brake band lining to brake bands, the combination of a support for a brake band, a head disposed above and in spaced relation to the support, a combined finder and rivet set slidably supported by the head and adapted to engage a hole in the brake band to centre the same, a plunger upon the support, means for operating the plunger to force a rivet thru the lining and into the centered hole and for holding the rivet in place while it is clinched by the set, and an abutment carried by said head to engage the upper face of the brake band and adjustable to limit the depth to which a rivet will be forced into the lining by the plunger.

9. In a machine for riveting brake band lining to brake bands, the combination of a support for a brake band, a head disposed above and in spaced relation to the support, a plunger for forcing a rivet upwardly into the brake lining to enter a hole in the brake band, a lever for actuating the plunger and adapted to be moved to its dead-centre position to lock the plunger in its uppermost position, and a set movable relatively to said head and operable as a finder to centre the hole in the brake band over the rivet and also to clinch the rivet after it is completely inserted by the movement of the plunger and while the rivet is supported by the locked plunger.

In testimony whereof, I have signed my name to this specification.

OSCAR L. SMITH.